United States Patent
Yu et al.

(10) Patent No.: US 12,100,071 B2
(45) Date of Patent: Sep. 24, 2024

(54) SYSTEM AND METHOD FOR GENERATING IMAGES OF THE SAME STYLE BASED ON LAYOUT

(71) Applicant: ELECTRONICS AND TELECOMMUNICATIONS RESEARCH INSTITUTE, Daejeon (KR)

(72) Inventors: Jung Jae Yu, Daejeon (KR); Ju Won Lee, Daejeon (KR); Won Young Yoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 30 days.

(21) Appl. No.: 17/739,375

(22) Filed: May 9, 2022

(65) Prior Publication Data
US 2023/0162409 A1 May 25, 2023

(30) Foreign Application Priority Data
Nov. 19, 2021 (KR) .......................... 10-2021-0160459

(51) Int. Cl.
| | | |
|---|---|---|
| G09G 5/00 | (2006.01) | |
| G06T 3/40 | (2006.01) | |
| G06T 7/11 | (2017.01) | |
| G06T 11/00 | (2006.01) | |

(52) U.S. Cl.
CPC .............. *G06T 11/001* (2013.01); *G06T 3/40* (2013.01); *G06T 7/11* (2017.01); *G06T 2207/10024* (2013.01); *G06T 2207/20081* (2013.01); *G06T 2207/20084* (2013.01)

(58) Field of Classification Search
CPC . G06T 11/001; G06T 3/40; G06T 7/11; G06T 2207/10024; G06T 2207/20081; G06T 2207/20084
USPC ....................................................... 345/660
See application file for complete search history.

(56) References Cited

U.S. PATENT DOCUMENTS

| | | | |
|---|---|---|---|
| 2016/0171954 A1* | 6/2016 | Guo ......................... | G06F 18/24 345/589 |
| 2019/0325628 A1* | 10/2019 | Dubey .................. | G06T 11/001 |
| 2020/0242771 A1 | 7/2020 | Park et al. | |
| 2021/0049741 A1 | 2/2021 | Yoo et al. | |
| 2021/0136416 A1 | 5/2021 | Kim et al. | |

(Continued)

OTHER PUBLICATIONS

Park, T. et al., "Semantic Image Synthesis with Spatially-Adaptive Normalization", arXiv:1903.07291v2 [cs.CV], pp. 1-19, Nov. 5, 2019.

(Continued)

*Primary Examiner* — Gordon G Liu
(74) *Attorney, Agent, or Firm* — Rabin & Berdo, P.C.

(57) ABSTRACT

Provided are a system and method for generating an image implemented in the same style as a style of a single image sample based on a result of learning the single image sample, the system including: an image learning unit configured to train a deep learning network model based on an image sample of a specific style to generate a same style generative model network; and an image generating unit configured to input a layout image to the same style generative model network to generate an image having the same style as the specific style image sample while conforming to a layout structure of the layout image.

16 Claims, 5 Drawing Sheets

(56) References Cited

U.S. PATENT DOCUMENTS

2021/0304487 A1* 9/2021 Sakurai .................. G06T 3/40
2022/0321830 A1* 10/2022 Niklaus .................. G06N 3/04
2023/0140225 A1* 5/2023 Ko ...................... G06V 40/171
382/103

OTHER PUBLICATIONS

Carlos Castillo et al., "Son of Zorn's Lemma: Targeted Style Transfer Using Instance-Aware Semantic Segmentation," IEEE, 2008.
Taesung Park et al,. "Semantic Image Synthesis with Spatially-Adaptive Normalization," IEEE, 2019.
Tamar Rott Shaham et al., "SinGAN: Learning a Generative Model from a Single Natural Image," IEEE, 2019.
Yong-mei Zhou et al., "A Region-based Image Segmentation Method with Mean-Shift Clustering Algorithm," IEEE, 2008.

* cited by examiner

SYSTEM AND METHOD FOR GENERATING IMAGES OF THE SAME STYLE BASED ON LAYOUT

CROSS-REFERENCE TO RELATED APPLICATION

This application claims priority to and the benefit of Korean Patent Application No. 10-2021-0160459, filed on Nov. 19, 2021, the disclosure of which is incorporated herein by reference in its entirety.

BACKGROUND

1. Field of the Invention

The present invention relates to a system and method for automatically generating an image.

2. Discussion of Related Art

Recently, various technologies that can generate new images using deep learning generative models have been announced. However, most image generation technologies operate by first learning a large amount of big data on images, and then generating or transforming a new image in a sampling method based on a data distribution of the learned images.

With such a conventional image generating technology, when an image implemented in a specific style desired by a user is found, it is difficult to generate an image implemented in the same style as the image while conforming to a layout set by the user.

RELATED ART DOCUMENTS

Patent Document

U.S. Laid-open Patent Publication No. 10-2020-0242771

SUMMARY OF THE INVENTION

The present invention is directed to providing a system and method for generating images of the same style that are capable of generating an image implemented in the same style as that of an image sample according to a set layout by simply learning the sample image without learning image big data.

The technical objectives of the present invention are not limited to the above, and other objectives may become apparent to those of ordinary skill in the art based on the following description.

According to an aspect of the present invention, there is provided a system for generating images of the same style, which is a system for generating an image implemented in the same style as a style of a single image sample based on a result of learning the single image sample, the system including: an image learning unit configured to train a deep learning network model based on an image sample of a specific style to generate a same style generative model network; and an image generating unit configured to input a layout image to the same style generative model network to generate an image having the same style as the specific style image sample while conforming to a layout structure of the layout image.

The same style generative model network may include: a sampling-based image generator configured to receive a noise vector to generate a color image sample having the same style as and a different shape from the specific style image sample; a layout image generator configured to receive the color image sample to generate a layout image in which each region is assigned an attribute; and a reconstructed image generator configured to receive an arbitrary layout image in which each region is assigned an attribute to generate a color image having the same style as the style of the specific style image sample while conforming to a layout structure of the arbitrary layout image.

The image learning unit may determine a set of layout images as an input, determine a set of color image samples as a label, and train a deep learning network to implement the reconstructed image generator.

The image learning unit may train a deep learning network in a direction that minimizes a reconstruction loss between a color image obtained by inputting the layout image to the deep learning network and a color image sample having been used to generate the layout image to implement the reconstructed image generator.

The layout image generator may generate a layout image through a segmentation network using semantic segmentation.

The layout image generator may generate a layout image in a form of a clustered color image through an image processing block using mean-shift clustering.

The image learning unit may downscale the layout image in the form of the clustered color image obtained through the layout image generator to a low resolution, and train a multi-scale layer network using the downscaled layout image and the noise vector to implement the reconstructed image generator.

According to another aspect of the present invention, there is provided a method of generating images of the same style, which is a method of generating an image implemented in the same style as a single image sample based on a result of learning the single image sample, the method including: training a generative adversarial network (GAN)-based network model based on a noise vector and an image sample implemented in a specific style to implement a sampling-based image generator; training a network model based on a large amount of training data to implement a layout image generator that generates a layout image in which each region is assigned an attribute; inputting an arbitrary noise vector into the sampling-based image generator to generate a set of color image samples, inputting the set of color image samples into the layout image generator to generate a set of layout images, and training a GAN-based network model, in which the set of layout images is used as an input and the set of color image samples is determined as a label, to implement a reconstructed image generator; and inputting an arbitrary layout image into the reconstructed image generator to generate a color image having the same style as and a different shape from the image sample implemented in the specific style.

The implementation of the layout image generator may include training a network constructed according to a DeepLab method, to implement a layout image generator that generates a layout image to which semantic region segmentation is applied.

The implementation of the layout image generator may include using an image processing block that uses mean-shift clustering, to implement a layout image generator that generates a layout image in the form of a clustered color image.

The implementation of the reconstructed image generator may include training the network model in a direction that minimizes a reconstruction loss between a set of color images obtained by inputting the set of layout images into the network model and the set of color image samples to implement the reconstructed image generator.

The implementation of the reconstructed image generator may include training the network model using a spatially-adaptive denormalization (SPADE) method to implement the reconstructed image generator.

The implementation of the reconstructed image generator may include: constructing the network module as a multi-scale layer network; downscaling the layout image in the form of the clustered color image obtained through the layout image generator to a low resolution, and training the multi-scale layer network using the downscaled layout image and a noise vector.

According to another aspect of the present invention, there is provided a method of training a reconstructed image generator, the method including: training a network model based on a noise vector and an image sample implemented in a specific style to implement a sampling-based image generator; training a network model based on a large amount of training data to implement a layout image generator that generates a layout image in which each region is assigned an attribute; and inputting an arbitrary noise vector into the sampling-based image generator to generate a set of color image samples, inputting the set of color image samples into the layout image generator to generate a set of layout images, and training a network model, in which the set of layout images is used as an input and the set of color image samples is determined as a label to implement a reconstructed image generator.

The implementation of the layout image generator may include training a network constructed according to a DeepLab method, to implement a layout image generator that generates a layout image to which semantic region segmentation is applied.

The implementing of the layout image generator may include using an image processing block that uses mean-shift clustering, to implement a layout image generator that generates a layout image in a form of a clustered color image.

The implementing of the reconstructed image generator may include training the network model in a direction that minimizes a reconstruction loss between a set of color images obtained by inputting the set of layout images into the network model and the set of color image samples to implement the reconstructed image generator.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

While the present invention is subject to various modifications and alternative forms, specific embodiments thereof are shown by way of example in the accompanying drawings and will herein be described in detail. However, it should be understood that there is no intent to limit the invention to the particular forms disclosed, rather the invention is to cover all modifications, equivalents, and alternatives falling within the spirit and scope of the invention. In the description of the present invention, the detailed description of related known functions or constructions will be omitted to avoid obscuring the subject matter of the present invention.

It should be understood that, although the terms first, second, etc. may be used herein to describe various elements, these elements are not limited by these terms. These terms are only used to distinguish one element from another element.

The terminology used herein is for the purpose of describing particular embodiments only and is not intended to limit the invention. As used herein, the singular forms "a," "an," and "one" are intended to include the plural forms as well, unless the context clearly indicates otherwise. It should be further understood that the terms "comprises," "comprising," "includes," and/or "including," when used herein, specify the presence of stated features, integers, steps, operations, elements, components and/or groups thereof, and do not preclude the presence or addition of one or more other features, integers, steps, operations, elements, components, and/or groups thereof. Hereinafter, embodiments of the present invention will be described in detail with reference to the accompanying drawings.

In addition, the term "unit" described in the specification refers to a unit of processing one or more functions or operations, and is implemented as hardware or software or a combination of hardware and software.

The present invention relates to a system and method for generating an image implemented in the same style as a style of a specific image. The present invention generates an image implemented in the same style as an image sample according to a set layout by simply learning of the single image sample without a need to learn big image data. Specifically, the image system and method according to the present invention automatically generate an image having the same style as a desired image while conforming to the shape structure of a layout image serving as a sketch.

Figure 1:
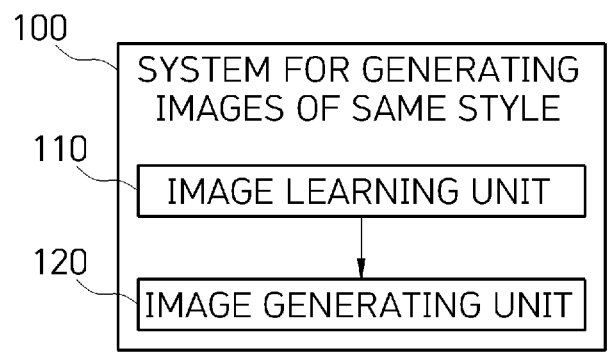
FIG. 1 is a block diagram illustrating the configuration of a system for generating images of the same style according to the present invention.

FIG. 1 is a block diagram illustrating the configuration of a system 100 (hereinafter, an image generating system) for generating images of the same style according to the present invention.

The image generating system 100 according to the present invention is provided to generate an image implemented in the same style as a style of a single image sample based on a result of learning the single image sample, and includes an image learning unit 110 and an image generating unit 120.

The image learning unit 110 trains a deep learning network based on an image sample implemented in a specific style (hereinafter, a desired style target image) to generate a same style image generative model network 200 (hereinafter, a generative model network). Here, the desired style target image is an image in which a style desired by the user of the image generating system 100 is implemented, and the desired style target image is used in a learning process of the image generating system 100. In addition, the generative model network 200 is a network generated by training a deep learning network based on a desired style target image by the image learning unit 110, and may be constructed through a connection between a plurality of sub-networks.

Figure 2:
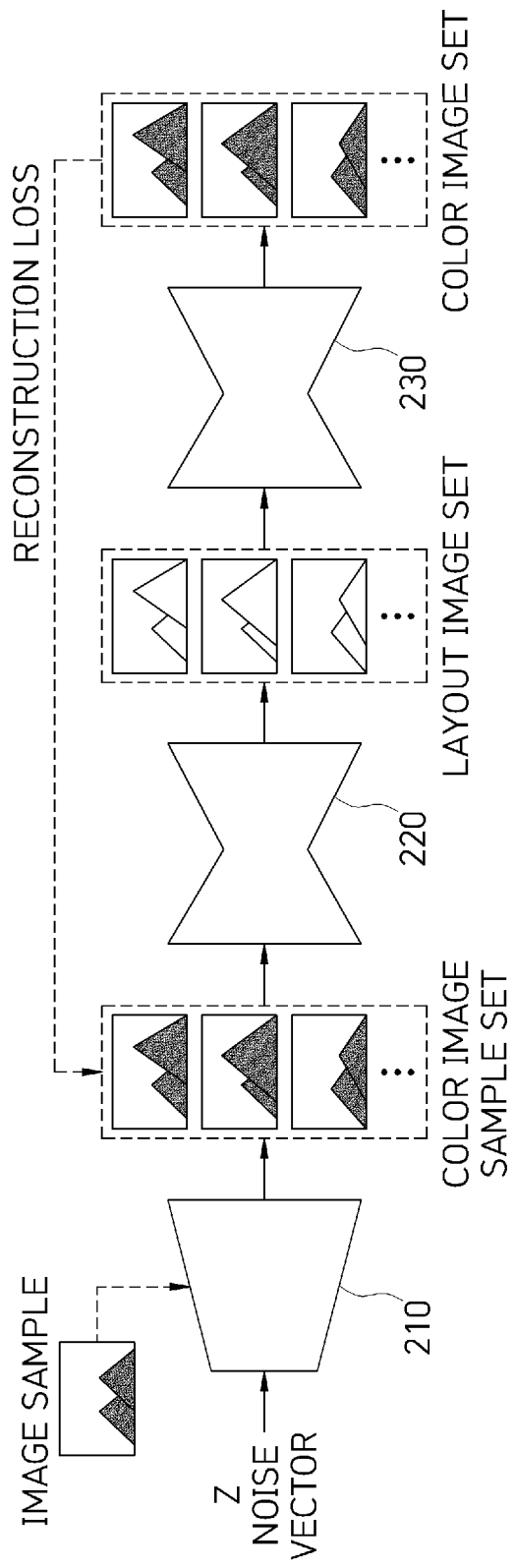
FIG. 2 is a reference diagram for describing a process of learning an image sample through a generative model network according to an embodiment of the present invention.

FIG. 2 is a reference diagram for describing a process of learning an image sample through the generative model network 200 according to an embodiment of the present invention.

According to the embodiment of FIG. 2, the plurality of sub-generative model networks constituting the generative model network 200 include a sampling-based image generator 210, a layout image generator 220, and a reconstructed image generator 230. The generative model network 200 is constructed by sequentially connecting the sub-generative model networks.

The sampling-based image generator 210 receives a noise vector (also referred to as a random noise image) and generates a color image sample having the same style as a style of a desired style target image. The sampling-based image generator 210 may generate a plurality of color image samples (a color image sample set). In this case, each of the color image samples has a different shape. The image learning unit 110 may implement the sampling-based image generator 210 by training a generative adversarial network (GAN)-based deep learning network using a noise vector and a desired style target image. For example, the image learning unit 110 may implement the sampling-based image generator by first inputting a noise vector to a generator of the lowest stage of a known multi-scale layer network, and then, for respective generators to generate color image samples, sequentially inputting a color image sample generated by a generator of a lower stage into a generator of the next upper stage together with the noise vector such that the generator of each level is trained while the generator and the discriminator of each level oppose each other. For reference, the multi-scale layer network is a network structure including a plurality of GANs in the form of a pyramid in which layers are divided by scale, and learning and inference proceed in a coarse-to-fine fashion, that is, in a direction from downscale (a low resolution) to upscale (a high resolution).

The layout image generator 220 receives the color image sample set to generate a layout image set. The layout image is an image generated to correspond to each of the color image samples included in the color image sample set, and having one or more divided regions each of which is assigned an attribute. As the attribute of a region, the name of a natural or geographic feature may be used. For example, sky, cloud, mountain, water, land, building, etc. may serve as the region attributes. The layout image set is a set of a plurality of layout images, and the color image samples included in the color image sample set have a one-to-one correspondence with the layout images included in the layout image set.

The layout image generator 220 may generate a layout image to which semantic segmentation is applied or a layout image in the form of a color information clustering image (a clustering color image). In the case of an image sample on which it is difficult to use semantic segmentation (difficult to use a segmentation network) because of its unique style, the layout image generator 220 may generate a layout image in the form of a clustering color image. That is, the clustering color image generation method may be utilized as an alternative to the segmentation network.

In order to generate a layout image to which semantic segmentation is applied, the layout image generator 220 may be implemented as a semantic segmentation network. For example, the image learning unit 110 may train a segmentation network constructed according to a known DeepLab method using a large amount of training data to implement the layout image generator 220. For reference, the DeepLab method is a method of constructing a semantic segmentation network by combining a deep convolutional neural network (DCNN)-based pixel-level classifier with a fully connected conditional random field (CRF) for post-processing.

Meanwhile, in order to generate a layout image in the form of a color information clustering image, the layout image generator 220 may be implemented using an image processing block that uses mean-shift clustering. That is, the image learning unit 110 may use a mean-shift clustering algorithm to implement the layout image generator 220 to generate a clustering color image.

The reconstructed image generator 230 receives the layout image to generate a color image implemented in the same style as that of the desired style target image. As described above, the layout image may include a layout image to which semantic segmentation is applied and a layout image in the form of a color information clustering image.

The reconstructed image generator 230 for generating a color image by receiving a layout image to which semantic segmentation is applied may be implemented through training of a multi-scale layer network. For example, the image learning unit 110 may train a GAN-based network structure using a known spatially-adaptive denormalization (SPADE) method to implement the reconstructed image generator 230. The image learning unit 110 may implement the reconstructed image generator 230 by calculating a loss (error) between the color image sample set and a color image set generated by the network having a layout image, to which semantic segmentation is applied, as an input, and training the network in a direction that minimizes the loss (error). The loss may be an adversarial loss or a reconstruction loss, or a combination of an adversarial loss and a reconstruction loss.

Meanwhile, the reconstructed image generator 230 for generating a color image by receiving a layout image in the form of a color information clustering image may be implemented using a known paint-to-image generative method. In this case, the reconstructed image generator 230 may reuse the structure (the multi-scale layer network) of the sampling-based image generator 210 as a network structure thereof. That is, the image learning unit 110 converts a layout image input to the multi-scale layer network to a low resolution according to each scale stage (down-scaling), and sequentially inputs a layout image and a noise vector by stages of scale in a direction from down-scale to up-scale, to generate a color image set. The image learning unit 110 calculates a loss (error) between the color image sample set and the color image set generated by the network, and trains the network in a direction that minimizes the loss (error) to implement the reconstructed image generator 230. The loss may be an adversarial loss or a reconstruction loss, or a combination of an adversarial loss and a reconstruction loss.

Figure 3:
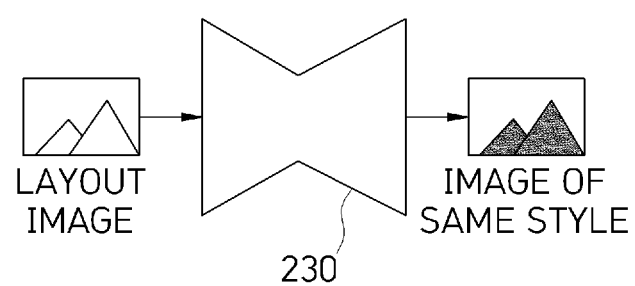
FIG. 3 is a reference diagram for describing a process of generating images of the same style according to the present invention.

The image generating unit 120 generates an image implemented in the same style as a style of a learned image while conforming to a layout structure of a layout image input to the generative model network. FIG. 3 is a reference diagram for describing a process of generating images of the same style according to the present invention. The process shown in FIG. 3 is an inference process, in which the image generating unit 120 generates an image using only the reconstructed image generator 230 among the sampling-based image generator 210, the layout image generator 220, and the reconstructed image generator 230 described above. In this process, the user may input an image (a layout image) generated based on a desired layout to the reconstructed image generator 230, and may obtain an image of the same style as the image sample, which has been used in the previous learning process, while maintaining the layout set by the user. Here, the layout image generated by the user may be a layout image that is a result of semantic segmentation, or a layout image in the form of a clustering color image, depending on the type of the trained reconstructed image generator 230.

Figure 4A:
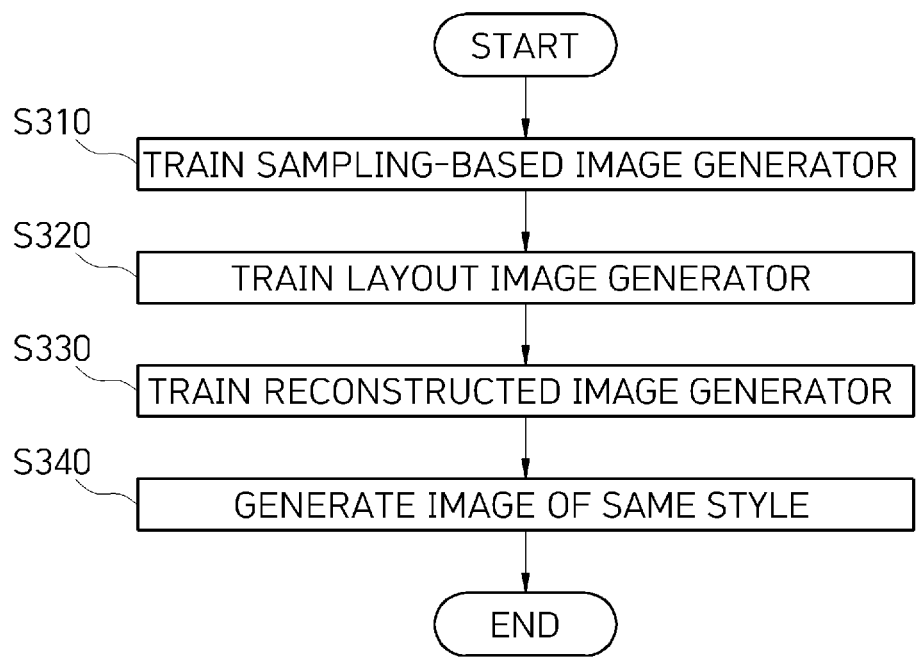
FIGS. 4A and 4B are flowcharts for describing a method of generating images of the same style according to an embodiment of the present invention.
Figure 4B:
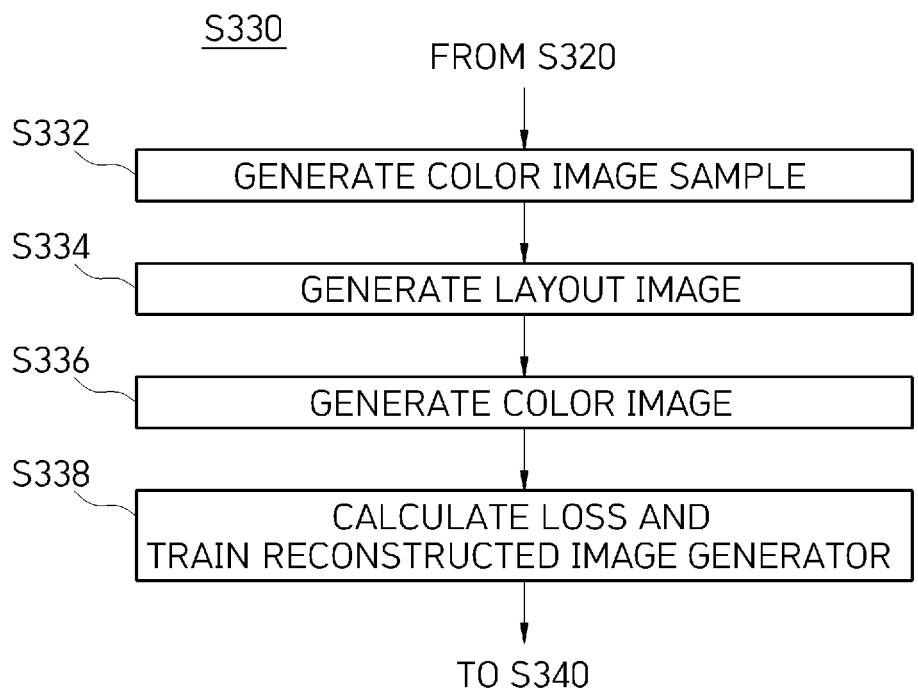

FIGS. 4A and 4B are flowcharts for describing a method of generating images of the same style according to an embodiment of the present invention. The method of generating images of the same style according to the embodiment of the present invention includes operations S310 to S340. Operations S310 to S330 correspond to an image sample training operation, and operation S340 corresponds to a same style image generating operation. Here, operation S320 may be performed after performing operation S310, or conversely, operation S310 may be performed after performing operation S320. Meanwhile, operation S330 includes operations S332 to S338 as shown in FIG. 4B.

Operation S310 is a sampling-based image generator training operation. The sampling-based image generator 210 is a network model configured to, based on an input noise vector and image sample having a desired style ("desired style target image"), generate a color image sample having the same style as and a different shape from the image sample. The image learning unit 110 generates the sampling-based image generator by training a deep learning network. For example, the deep learning network may have a known multi-scale layer network structure including a plurality of GANs arranged by layers according to scale. In this case, the image learning unit 110 trains the multi-scale layer network structure in a direction from down-scale (low-resolution) to up-scale (high-resolution). The image learning unit 110 implements the sampling-based image generator 210 by training generators and a discriminator included in the multi-scale hierarchical network in opposition to each other, in which a random noise image and an image generated at a previous scale are input to each generator to generate a fake image, and a discriminator in the same layer as the generator is allowed to determine the fake image.

Operation S320 is a layout image generator training operation. The layout image generator 220 is a network model that receives a color image sample to generate a layout image. The layout image generator 220 may receive a plurality of color image samples (a color image sample set) to generate a plurality of layout images (a layout image set).

The layout image generator 220 may generate a layout image to which semantic segmentation is applied or may generate a layout image in the form of a color information clustering image (a clustering color image).

When the layout image generator 220 generates a layout image to which semantic segmentation is applied, the layout image generator 220 is implemented as a semantic segmentation network. For example, the image learning unit 110 may implement the layout image generator 220 by training a segmentation network constructed according to a known DeepLab method using a large amount of training data.

On the other hand, when the layout image generator 220 generates a layout image in the form of a color information clustering image, the layout image generator 220 may be implemented using an image processing block that uses mean-shift clustering. That is, the image learning unit 110 may implement the layout image generator 220 that generates a clustering color image using a mean shift clustering algorithm.

Operations S310 and S320 are independent of each other in execution. For example, operation S320 may be performed after operation S310, operation S320 may be performed before operation S310, or operation S310 and operation S320 may be simultaneously performed.

Operation S330 is a reconstructed image generator training operation. The reconstructed image generator 230 is a network model that receives a layout image and generates a color image implemented in the same style as a desired style. The reconstructed image generator 230 may receive a plurality of layout images (a layout image set) and generate a plurality of color images (a color image set). The method of training the reconstructed image generator 230 may vary depending on the shape of the layout image. For example, the image learning unit 110 may implement the reconstructed image generator 230 by training a GAN-based network using a known SPADE method such that the reconstructed image generator 230 may process a layout image according to semantic segmentation. In addition, the image learning unit 110 may implement the reconstructed image generator 230 by training the multi-scale layer network described above in operation S310 according to an adversarial loss or reconstruction loss minimization algorithm such that the reconstructed image generator 230 may process a layout image according to a color information clustering image. In this case, the reconstructed image generator 230 may be implemented using a paint-to-image method.

Operation S330 includes operations S332 to S338. A label (an output) image (a color image sample set) required for training the reconstructed image generator 230 may be obtained through operation S332, and an input image (a layout image set) required for training the reconstructed image generator 230 may be obtained through operation S334. A deep learning network is trained in a direction that minimizes an adversarial loss or reconstruction loss to generate the reconstructed image generator 230 through operations S336 and S338.

Operation S332 is a color image sample generating operation. The image learning unit 110 inputs a noise vector and an image sample containing a desired style to the sampling-based image generator 210 to generate a set of color image samples (a color image sample set) implemented in different shapes while having the same style as the image sample.

Operation S334 is a layout image generating operation. The image learning unit 110 inputs the color image sample set to the layout image generator 220 to generate a layout image set. The image learning unit 110 may generate a layout image set according to semantic segmentation or a layout image set in the form of a clustering color image through the layout image generator 220. The image learning unit 110 may select the layout image set generation method by determining the specificity of a desired style target image according to a predetermined criterion.

Operation S336 is a color image generating operation. The image learning unit 110 inputs the layout image set to a network model to generate a color image set. The image learning unit 110 may, when a layout image set according to semantic segmentation is input, obtain a color image set through a network model implemented in the SPADE method, and when a layout image set in the form of a clustering color image is input, obtain a color image set through a multi-scale layer network implemented in a paint-to-image manner. In this case, the image learning unit 110 converts the layout image to a low resolution according to each scale stage (down-scaling), and sequentially inputs the layout image together with the noise vector to the multi-scale layer network in a direction from down-scale to up-scale to obtain the color image set.

Operation S338 is a loss calculation and training operation. The image learning unit 110 calculates a loss (an error) based on the color image sample set and the color image set, and trains a network model in a direction that minimizes the loss (the error) to generate the reconstructed image generator 230. The loss may be an adversarial loss or a reconstruction loss, or a combination of an adversarial loss and a reconstruction loss. Through the training process of operation S338, the reconstructed image generator 230 may generate a color image of the same style as the desired style target image.

Operation S340 is a same style image generating operation (an inference operation). The image generating unit 120 inputs an arbitrary layout image that is set by the user to the reconstructed image generator 230 to generate a color image of the same style as a desired style target image. The image generating unit 120 may, based on an image (a layout image) generated by applying a desired layout of the user being input to the reconstructed image generator 230, obtain an image of the same style as that of the desired style target image while maintaining the layout set by the user. Here, the layout image generated by the user may represent a semantic segmentation layout image or a layout image in the form of clustering color image according to the type of the reconstructed image generator 230.

As is apparent from the above, according to the system and method for generating images of the same style, an image implemented in the same style as that of an image sample can be generated according to a set layout by simply learning the sample image without learning big image data.

In addition, the system and method for generating images of the same style can be used to directly generate a new work of art having a different structure while exhibiting the same concept or style as that of a conventional work of art, and thus can be used as experiential art education content or can increase the effect of automation of a media art content production process using a conventional painting.

Although exemplary embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A system for generating images of a same style, which is a system for generating an image implemented in a same style as a style of a single image sample based on a result of learning the single image sample, the system comprising:
    an image learning unit configured to train a deep learning network model based on an image sample of a specific style to generate a same style generative model network;
    an image generating unit configured to input a layout image to the same style generative model network to generate an image having a same style as a specific style image sample while conforming to a layout structure of the layout image;
    wherein the same style generative model network includes:
        a sampling-based image generator configured to receive a noise vector to generate a color image sample having the same style as and a different shape from the specific style image sample;
        a layout image generator configured to receive the color image sample to generate a layout image in which each region is assigned an attribute; and
        a reconstructed image generator configured to receive an arbitrary layout image in which each region is assigned an attribute to generate a color image having the same style as the style of the specific style image sample while conforming to a layout structure of the arbitrary layout image.

2. The system of claim 1, wherein the image learning unit determines a set of layout images as an input, determines a set of color image samples as a label, and trains a deep learning network to implement the reconstructed image generator.

3. The system of claim 1, wherein the image learning unit trains a deep learning network in a direction that minimizes a reconstruction loss between a color image obtained by inputting the layout image to the deep learning network and a color image sample having been used to generate the layout image, to implement the reconstructed image generator.

4. The system of claim 1, wherein the layout image generator generates a layout image through a segmentation network using semantic segmentation.

5. The system of claim 1, wherein the layout image generator generates a layout image in a form of a clustered color image through an image processing block using mean-shift clustering.

6. The system of claim 5, wherein the image learning unit:
    downscales the layout image in the form of the clustered color image obtained through the layout image generator to a low resolution; and
    trains a multi-scale layer network using the downscaled layout image and the noise vector to implement the reconstructed image generator.

7. A method of generating images of a same style, which is a method of generating an image implemented in a same style as a single image sample based on a result of learning the single image sample, the method comprising:
    training a generative adversarial network (GAN)-based network model based on a noise vector and an image sample implemented in a specific style to implement a sampling-based image generator;
    training a network model based on a large amount of training data to implement a layout image generator that generates a layout image in which each region is assigned an attribute;
    inputting an arbitrary noise vector into the sampling-based image generator to generate a set of color image samples, inputting the set of color image samples into the layout image generator to generate a set of layout images, and training a GAN-based network model, in which the set of layout images is used as an input and the set of color image samples is determined as a label, to implement a reconstructed image generator; and
    inputting an arbitrary layout image into the reconstructed image generator to generate a color image having a same style as and a different shape from the image sample implemented in the specific style.

8. The method of claim 7, wherein the implementation of the layout image generator includes training a network constructed according to a DeepLab method, to implement a layout image generator that generates a layout image to which semantic region segmentation is applied.

9. The method of claim 7, wherein the implementation of the layout image generator includes using an image processing block that uses mean-shift clustering to implement a layout image generator that generates a layout image in a form of a clustered color image.

10. The method of claim 7, wherein the implementation of the reconstructed image generator includes training the network model in a direction that minimizes a reconstruction loss between a set of color images obtained by inputting the set of layout images into the network model and the set of color image samples to implement the reconstructed image generator.

11. The method of claim 8, wherein the implementation of the reconstructed image generator includes training the network model using a spatially-adaptive denormalization (SPADE) method to implement the reconstructed image generator.

12. The method of claim 9, wherein the implementation of the reconstructed image generator includes:
   constructing the network module as a multi-scale layer network;
   downscaling the layout image in the form of the clustered color image obtained through the layout image generator to a low resolution, and
   training the multi-scale layer network using the downscaled layout image and a noise vector.

13. A method of training a reconstructed image generator, the method comprising:
   training a network model based on a noise vector and an image sample implemented in a specific style to implement a sampling-based image generator;
   training a network model based on a large amount of training data to implement a layout image generator that generates a layout image in which each region is assigned an attribute; and
   inputting an arbitrary noise vector into the sampling-based image generator to generate a set of color image samples, inputting the set of color image samples into the layout image generator to generate a set of layout images, and training a network model, in which the set of layout images is used as an input and the set of color image samples is determined as a label to implement a reconstructed image generator;
   wherein the reconstructed image generator is configured to receive an arbitrary layout image in which each region is assigned an attribute to generate a color image having a same style as a style of a specific style image sample while conforming to a layout structure of the arbitrary layout image.

14. The method of claim 13, wherein the implementation of the layout image generator includes training a network constructed according to a DeepLab method to implement a layout image generator that generates a layout image to which semantic region segmentation is applied.

15. The method of claim 13, wherein the implementation of the layout image generator includes using an image processing block that uses mean-shift clustering to implement a layout image generator that generates a layout image in a form of a clustered color image.

16. The method of claim 13, wherein the implementation of the reconstructed image generator includes training the network model in a direction that minimizes a reconstruction loss between a set of color images obtained by inputting the set of layout images into the network model and the set of color image samples to implement the reconstructed image generator.

* * * * *